Figure 1:
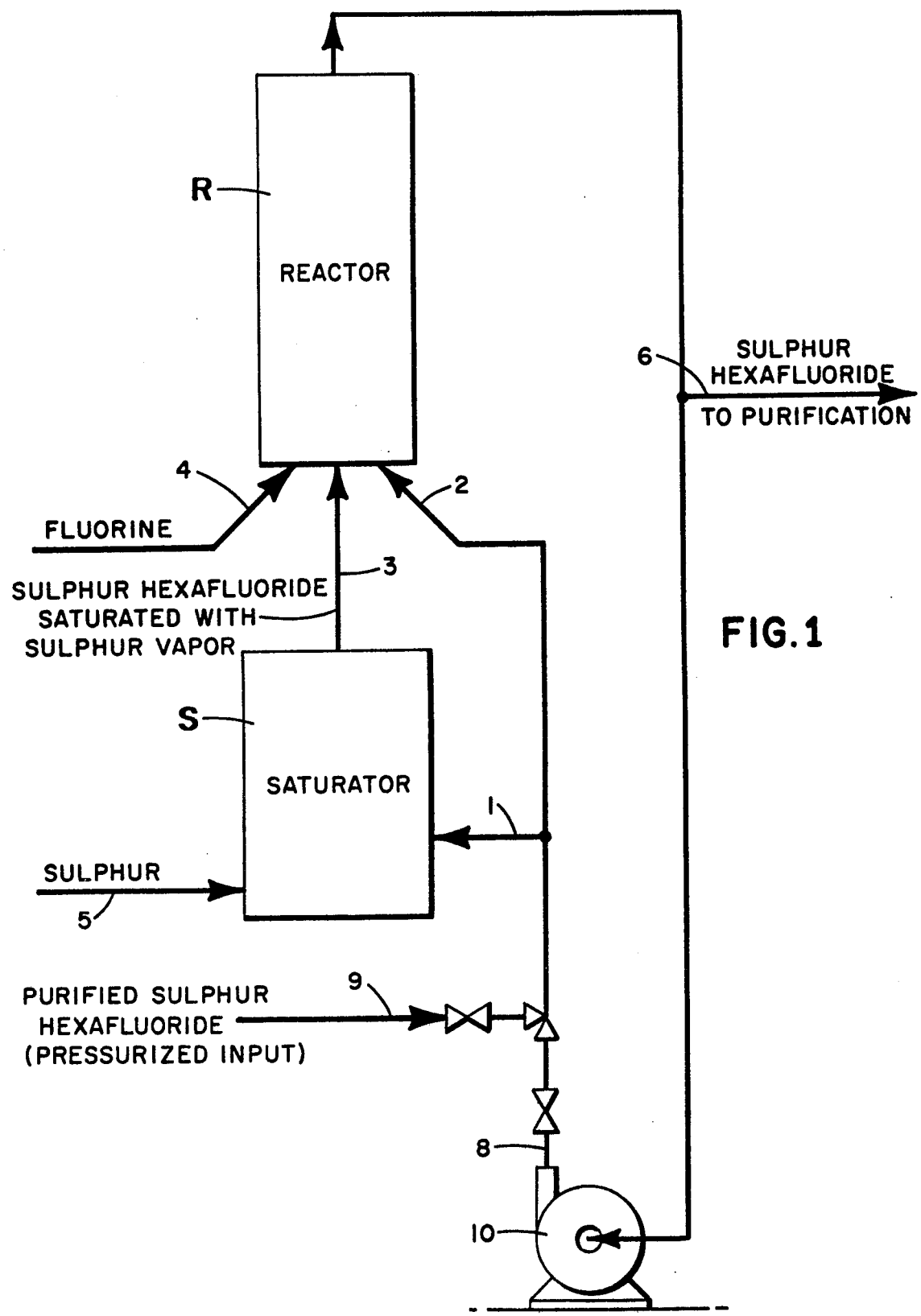

United States Patent [19]

Di Gioacchino et al.

[11] 4,246,236
[45] Jan. 20, 1981

[54] APPARATUS FOR CARRYING OUT GASEOUS PHASE REACTIONS

[75] Inventors: Alberto Di Gioacchino; Giulio Tommasi; Mario de Manuele, all of Milan, Italy

[73] Assignee: Montedison S.p.A., Milan, Italy

[21] Appl. No.: 48,165

[22] Filed: Jun. 12, 1979

Related U.S. Application Data

[62] Division of Ser. No. 897,741, Apr. 17, 1978, Pat. No. 4,186,180.

[30] Foreign Application Priority Data

Apr. 19, 1977 [IT] Italy ............... 22611 A/77

[51] Int. Cl.³ .......... B01J 19/26; B05B 7/06; C01B 17/45
[52] U.S. Cl. ............... 422/202; 239/132.3; 239/290; 239/419.3; 239/424.5; 239/428; 422/224; 422/234; 422/310; 431/175; 431/187
[58] Field of Search ............. 422/202, 234, 235, 240, 422/129, 224, 310; 239/105, 132.3, 290, 419.3, 422, 428, 430, 432, 433, 424.5; 431/175, 187; 423/469, 489

[56] References Cited

U.S. PATENT DOCUMENTS

| 1,790,395 | 1/1931 | Warner | 431/175 |
| 3,048,476 | 8/1962 | Dwyer | 422/202 X |
| 3,336,111 | 8/1967 | Watson et al. | 423/469 X |
| 3,565,345 | 2/1971 | Moltzan | 239/422 |
| 3,809,524 | 5/1974 | Bruhlet et al. | 239/433 X |

FOREIGN PATENT DOCUMENTS

| 1445502 | 6/1966 | France | 423/469 |
| 1175774 | 12/1969 | United Kingdom | 423/469 |

*Primary Examiner*—Joseph Scovronek
*Attorney, Agent, or Firm*—Stevens, Davis, Miller & Mosher

[57] ABSTRACT

Apparatus is disclosed for the carrying out of gaseous phase reactions, illustrated by way of example by the preparation of sulphur hexafluoride of high purity, starting from elemental fluorine and sulphur, both in gaseous phase. One of the gaseous reactants, e.g., the fluorine, is fed into a reaction chamber through inlets in a metal plate, maintained at between 30° and 70° C. while the other, e.g., sulphur in gaseous phase, is fed in through the nozzle of a burner, e.g., by regulating a current of an inert gas which is saturated with sulphur by passing same through a zone containing molten sulphur at a temperature between 250° and 500° C., and subsequently superheating the inert gas thus saturated with sulphur to a temperature between 300° and 550° C., and introducing a separate current of the same inert gas between the plate and the burner so as to ensure that the flame that develops when the sulphur and the fluorine come into reactive contact with each other shall be kept insulated from the nozzle.

3 Claims, 2 Drawing Figures

APPARATUS FOR CARRYING OUT GASEOUS PHASE REACTIONS

This is a division of application Ser. No. 897,741, filed Apr. 17, 1978 now U.S. Pat. No. 4,186,180, granted Jan. 29, 1980.

The present invention relates to novel apparatus for carrying out gaseous phase reactions at elevated temperature. The apparatus is illustrated for convenience, and purely by way of example, for use in the preparation of sulphur hexafluoride of high purity starting from the elements thereof.

Sulphur hexafluoride is a chemically inert gas which, thanks to its appreciable insulating properties, is used in high-voltage line switches, in transformers, and in radar and electronic equipment.

In order that the sulphur hexafluoride may be applied to these fields of use, however, it is necessary that it be of high purity.

The usual methods for the preparation of sulphur hexafluoride are based on direct reaction between fluorine and sulphur or between fluorine and sulphur compounds such as for instance $H_2S$ and $CS_2$. These latter evidently are not competitive due to the exceedingly high consumption of costly electrolytic fluorine.

Processes based on direct synthesis from the elements differ in the type of feeding of the sulphur to the reaction; this is to say, in whether the sulphur is fed in the liquid or the gaseous phase.

The use of sulphur in the liquid state in general leads to the formation of incompletely fluorinated compounds, such as for instance $S_2F_2$, $SF_4$, $S_2F_{10}$, in rather considerable quantities with the consequential lowering of the yield in respect of the desired sulphur hexafluoride.

The use of liquid sulphur brings with it, moreover, still another drawback: the sulphur hexafluoride thus obtained contains sulphur vapors which, sublimating, cause clogging problems in the piping downstream of the reactor.

By the use of sulphur in the vapor state, one obtains the advantage of reducing the fraction of incompletely fluorinated compounds by conducting the reaction with a slight excess of fluorine. In this case too, however, one meets with the difficulty of handling or regulating the sulphur vapor; a difficulty which leads to serious shortcomings of a technical nature such as clogging in the coldest points of the system due to the effect of sublimation.

Thus, one object of this invention is that of providing apparatus for carrying out gaseous phase reactions at elevated temperatures, and especially where problems of the kind just indicated are likely to be encountered.

According to one arrangement by which this invention is illustrated for the sake of convenience, means are provided for feeding elemental fluorine into the reaction chamber through holes made in a metal plate maintained at a temperature between 30° and 70° C. while means are provided for feeding the sulphur in gaseous phase through the nozzle of a burner, including means for regulating a flow of inert gas which is saturated by passing it through an apparatus containing molten sulphur at between 250° and 500° C. and means for subsequently overheating or superheating the flow of sulphur-saturated inert gas to a temperature between 300° and 550° C., while a current of the same inert gas is fed between the plate and the burner so that the flame, which develops when the sulphur comes into contact with the fluorine, is kept detached or separated from the nozzle.

The sulphur hexafluoride formed by reaction in this manner is then subjected to conventional purification processes per se well known in the prior art.

As the inert gas there may be used a portion of the sulphur hexafluoride which is produced, this being partially recycled as such or after purification.

Figure 2:
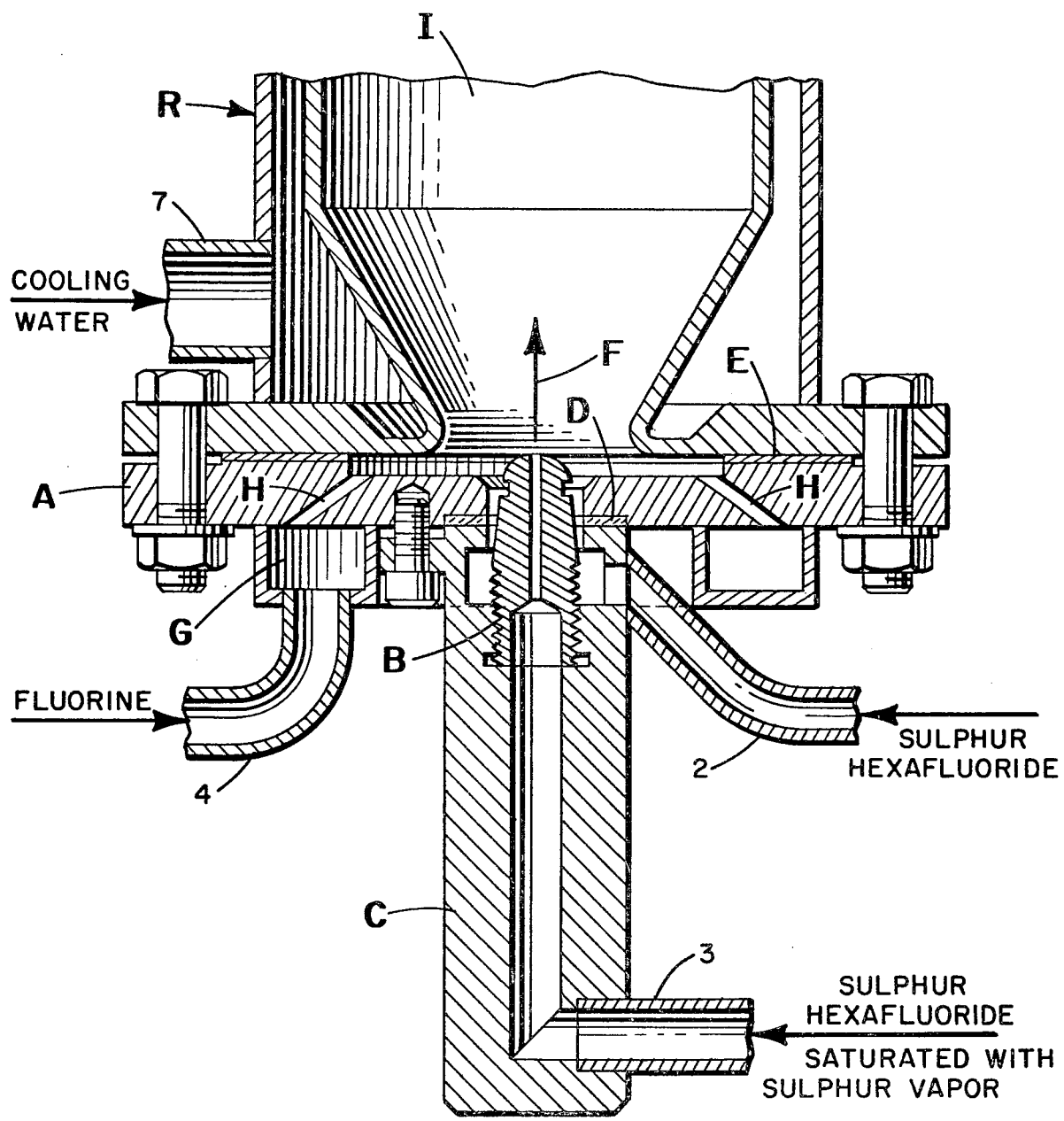

In order still better to understand this invention reference is made to the accompanying drawings wherein FIG. 1 is a flowsheet of the overall process, while FIG. 2 shows the novel reactor arrangement which is specifically claimed herein.

As shown in FIG. 1, a current of elemental fluorine is introduced through 4 into the bottom of reactor R, while from the top of this reactor the sulphur hexafluoride product flows out and is then conveyed to the conventional purification processes. The sulphur hexafluoride may be sent to purification through 6 only in part, while the other part of it is recycled through 8, and subdivided into two flows: flow 1, which enters apparatus S in which it will be saturated with sulphur vapors, and flow 2, which will be directly conveyed to the bottom of the reactor. To saturator S the sulphur is fed in through 5, while through 3 the sulphur hexafluoride saturated with sulphur vapors is fed into the reactor.

Instead of directly recycling a portion of the sulphur hexafluoride product, one may instead (or in addition) employ purified sulphur hexafluoride, which is fed into the system under pressure through 9.

The necessary flow of gases in the system is effected in any well known manner such as by a pump shown schematically at 10.

FIG. 2 represents the apparatus used for the practical realization of this invention.

Through pipe 4 the elemental fluorine enters an annular chamber G from where, via a number of holes H drilled into metal plate A, it flows into the frusto-conical reaction chamber I.

The metal plate A is made of a material having good thermal conductivity and resistance to chemical attack. For instance, brass has proved to be particularly suited for the purposes.

The holes H of the plate A are arranged on the circumference of a circle concentric with respect to the point of introduction of the sulphur F and are close to each other in order to achieve a distribution that is the closest possible to a continuous line or sheet of incoming fluorine. Moreover, they are arranged in such a way that their axes shall form with the horizontal surface of the plate A an angle between 20° and 45°, in order to avoid the deposit of solid substances dragged along by the fluorine on the cold wall of the reaction chamber.

Metal plate A is kept cold at a temperature between 30° and 70° C., by conduction through a metal gasket E, for instance soft copper, placed between the plate and the bottom of the reaction chamber.

The recycling sulphur hexafluoride, which, as previously indicated, may be either a portion of that directly flowing out of the reactor or that obtained after purification or a mixture of the two, is subdivided into two streams 2 and 3.

Since, in the particular method shown for purposes of illustration, one always operates with a slight excess of fluorine in order to avoid the formation of underfluorinated compounds, for the regulation of flow 3 there must be taken into account the fluorine in excess in the final sulphur hexafluoride product. Said fluorine-plus-sulphur hexafluoride current, after saturation with sulphur vapors at a temperature of between 250° and 500° C., but preferably between 360° and 400° C., and overheated or superheated to between 300° and 550° C., but preferably to 400° to 440° C., is fed into the reactor through a block C made of a corrosion-resistant material having good thermal conductivity such as for instance Inconel 600, Hastelloy C, Hastelloy B, and which is kept at a temperature greater than that of saturation of the $SF_6$ with sulphur vapors, i.e., at 300° to 550° C., by means of e.g. conventional electrical resistance heaters (not shown).

From block C, positioned at the center of the plate A, current 3 reaches the reaction chamber I through nozzle B made of the same material as block C, threaded to the block itself and maintained at the same temperature at which the block C is maintained in order to hinder the deposition of sulphur on the cold walls.

For greater resistance to the corrosion from fluorine, the outside surface of the nozzle may be either nickel, monel or palladium-plated, or coated with a layer of an inorganic fluoride such as for instance calcium fluoride.

Current 2, which is fed between the nozzle B and the plate A, must have the same temperature as that of current 3 in order not to cool down nozzle B, and serves the purpose of keeping the flame away from contact with the nozzle B itself in order to avoid damaging the nozzle by the heat of the flame.

The assembly of block C and nozzle B, as has been previously indicated, is maintained at a temperature greater than the saturation temperature of the sulphur hexafluoride saturated with sulphur, and is connected to plate A.

Between block-nozzle assembly C-B and the plate A there is disposed an insulating gasket D, for instance of asbestos. The block-nozzle assembly may also be made as one single block.

The reaction chamber is cooled by a water jacket whose circulating water (introduced via line 7) removes the reaction heat, and may be made of carbon steel, Inconel 600, nickel or other corrosion-resistant materials.

From the lower zone of the reaction chamber the gases, after having reacted in the gaseous phase, flow into the upper zone where, passing through e.g. a water-cooled tube nest (not shown), they are further cooled down.

At the outlet of the reactor the gases are analyzed because, as previously indicated, the regulation of the recycle flow rate is determined on the basis of the fluorine content of the raw product gases.

The quantity of the recycle (sum of current 2 plus current 1) in general may vary from 0.1 to 4 times the quantity produced (current 6) and it will depend on the saturation temperature of the sulphur. The distribution of the recycle between the two currents 2 and 1 is likewise quite variable depending on the operational conditions, but in general is maintained around a ratio of 1:1. These ratios are by weight.

The sulphur hexafluoride that is not recycled, before being utilized industrially, is purified by using conventional methods of the prior art. For example, the effluent gases may be subjected to a first washing in water, and then to a washing with an aqueous potash or caustic soda solution in order to eliminate the water-soluble impurities and/or the impurities hydrolyzable in alkali, such as for instance HF, $F_2$, $SF_4$, $S_2F_2$, $SO_2F_2$. The gases may then be passed successively through active carbon in order to eliminate possible high-boiling substances such as $S_2F_{10}$, $SF_5$—O—$SF_5$, then dried on soda flakes and on molecular sieves for the elimination of moisture, after which they are then compressed, rectified for the removal of oxygen, nitrogen and $CF_4$, and finally conveyed to storage.

The following examples are given purely for illustrative and not limiting purposes:

EXAMPLE 1

Reference is made to the flowsheet of FIG. 1 and to the apparatus of FIG. 2.

From an electrolytic cell into the annular chamber G, welded to plate A and made of brass, were fed 2.8 kg/hr. of $F_2$. The plate A was maintained at a temperature of around 40° C. by reason of the conductivity of copper gasket E.

The fluorine is fed into the annular chamber G and from there it is distributed through 16 holes of 4 mm diameter, spaced from each other about 21 mm, and whose axes form with the horizontal surface of the plate an angle of 30°.

From the reactor I, 4.5 kg/hr. of recycled sulphur hexafluoride are split into two about equal currents of which one (via line 2) is used for isolating the flame of the burner while the other (first via line 1 then via line 3) serves as a transportation or carrier gas for the sulphur.

This latter portion (from line 1) is made to bubble through molten sulphur in a relatively small tank, kept at about 400° C. by means of electrical resistance. Thereafter it is fed to the reactor I via line 3 through block C, the latter being kept at about 420° C. by electrical heaters, and through nozzle B which is kept at a temperature greater than 400° C. by conductivity from the block C. The block C, the nozzle B, and the associated piping to be maintained under heat are made of Inconel 600.

The gases flowing out of the reactor I showed the following composition:
HF 5.55% by weight
$SF_6$ 93.95% by weight
$F_2$ 0.50% by weight After purification according to conventional prior art methods, that is by washing with water and an alkaline bath, then passing over active carbon and molecular sieves, rectification for separation of oxygen, nitrogen and $CF_4$, the purified gases having the following composition:
$SF_6$ 99.9940% by weight
air 0.0013% by weight
$CF_4$ 0.0047% by weight
moisture 0.61 ppm
acidity (as HF) 0.03 ppm
hydrolyzable F 0.011 ppm
toxicity none
were sent to storage.

The output rate was about 3.5 kg/hr. of purified gas, while the yield of the action was 99.36% based on the fed fluorine.

EXAMPLE 2

Using the same equipment as described in the preceding example, into the annular changer G were introduced 2.8 kg/hr. of electrolytic fluorine. The temperature of the plate was maintained at about 40° C. as in the preceding example.

As the carrier gas this time, relatively pure sulphur hexafluoride that had been subjected to various conventional purification processes (current 9 of FIG. 1) was employed.

The flow rate of $SF_6$ used for the transport of the sulphur was 1.1 kg/hr. while the temperature of the sulphur bath was maintained at about 375° C.

The temperature of block C and of nozzle B was maintained at a level above 375° C., and more particularly around 400° C.

The flow rate of the sulphur hexafluoride fed in (via line 2) for separating the flame from the burner amounted to about 0.5 kg/hr.

The gases flowing out of the reactor had on the average the following composition:
HF 5.56% by weight
$SF_6$ 93.44% by weight
$F_2$ 1.00% by weight After purification, the product gases showed the following composition:
$SF_6$ 99.9937% by weight
air 0.0045% by weight
$CF_4$ 0.0012% by weight
moisture <1 ppm
acidity (as HF) 0.023 ppm
toxicity none In this example the output rate of purified gas was around 3.5 kg/hr., while the reaction yield was 98.65% based on the fed fluorine.

It will be readily apparent to those skilled in the art that other substances besides sulphur and fluorine may be similarly reacted by contacting same in gaseous phase at elevated temperatures in the apparatus of the present invention.

What is claimed is:

1. An apparatus for carrying out reactions in gaseous phase at elevated temperatures, said apparatus comprising a frusto-conical reaction chamber made of a corrosion resistant material having a bottom disposed adjacent a metal plate made of a material having good thermal conductivity; a gasket made of a material having high thermal conductivity disposed between said plate and the bottom of said reaction chamber, said plate having holes formed therein by means of which one reactant in gaseous phase is introduced into the reaction chamber, said holes being arranged on a circumference of a circle concentric with the inlet point of a second reactant, and the axis of each hole forming with the horizontal surface of the plate an angle between 20° and 45°; means for introducing a second reactant in gaseous phase, via a nozzle secured to a block arranged near an opening in the center of the plate; a heat-insulating gasket disposed between said plate and said block; means for introducing a separate current of inert gas between the nozzle and the plate so as to keep the flame resulting from the reaction of the reactants while in gaseous phase spaced from the nozzle itself; cooling means disposed within the reaction chamber comprising a water jacket surrounding at least the lower portion of the reaction chamber; and, within the reaction chamber and spaced from the nozzle through which the reactants in gaseous phase are introduced, a nest of heat exchange tubes within which is circulated a heat exchange fluid for cooling the hot reaction gases.

2. An apparatus according to claim 1, characterized in that the nozzle and the block are made in one single block.

3. An apparatus according to claim 1, characterized in that the holes through which is fed in the first reactant in gaseous phase are spaced from each other by about 20 mm.

* * * * *